US012304046B2

(12) United States Patent
Wang

(10) Patent No.: US 12,304,046 B2
(45) Date of Patent: May 20, 2025

(54) NAILING DEVICE

(71) Applicant: HANGZHOU GREAT STAR INDUSTRIAL CO., LTD., Hangzhou (CN)

(72) Inventor: Weiyi Wang, Hangzhou (CN)

(73) Assignee: Hangzhou Great Star Industrial Co., Ltd., Hangzhou (CN)

( * ) Notice: Subject to any disclaimer, the term of this patent is extended or adjusted under 35 U.S.C. 154(b) by 117 days.

(21) Appl. No.: 18/164,909

(22) Filed: Feb. 6, 2023

(65) Prior Publication Data

US 2023/0182277 A1 Jun. 15, 2023

Related U.S. Application Data

(63) Continuation-in-part of application No. PCT/CN2020/107758, filed on Aug. 7, 2020.

(51) Int. Cl.
*B25C 7/00* (2006.01)

(52) U.S. Cl.
CPC .................................... *B25C 7/00* (2013.01)

(58) Field of Classification Search
CPC ........................................ B25C 7/00
USPC ........................................ 227/107
See application file for complete search history.

(56) References Cited

U.S. PATENT DOCUMENTS

2005/0145670 A1* 7/2005 Huang .................... E04F 21/22 227/151
2016/0129573 A1* 5/2016 Anstett .................. E04F 21/22 227/148
2016/0271776 A1* 9/2016 Yang ........................ B25C 7/00
(Continued)

FOREIGN PATENT DOCUMENTS

CN 201685230 U 12/2010
CN 204590545 U 8/2015
CN 107160332 A 9/2017
(Continued)

OTHER PUBLICATIONS

WIPO; International Search Report and Written Opinion for International Application No. PCT/CN2020/107758, mailed Apr. 25, 2021.

*Primary Examiner* — Praachi M Pathak
(74) *Attorney, Agent, or Firm* — Fitch, Even, Tabin & Flannery LLP

(57) ABSTRACT

The present invention relates to a nailing device, which includes a nail gun and a support frame. The nail gun has a nail ejection portion, and the nail ejection portion is used to provide a nail ejection channel to drive a nail out. The support frame has a support surface. The support frame is used to support the nail gun. The support frame is adjustably connected to the nail gun. The nailing device of the present invention can, after the support frame is connected to the nail gun, help the nail gun to stably perform inclined nailing, which can be used as a nail gun for nailing a flooring. The support frame and the nail gun may be in a quick-change connection, which is convenient to use. The position where the support frame is connected to the nail gun is adjustable, which is applicable to edge nailing of plates with different thicknesses, and the scope of application is enlarged. The nailing device of the present invention has a simple structure and low production costs, and is economical and practical.

19 Claims, 17 Drawing Sheets

(56) References Cited

U.S. PATENT DOCUMENTS

| | | | | |
|---|---|---|---|---|
| 2023/0182277 | A1* | 6/2023 | Wang | B25C 7/00<br>227/107 |

FOREIGN PATENT DOCUMENTS

| | | | |
|---|---|---|---|
| CN | 210757546 | U | 6/2020 |
| JP | 2020114610 | A | 7/2020 |
| WO | 2022027570 | A1 | 8/2020 |

* cited by examiner

NAILING DEVICE

CROSS-REFERENCE TO RELATED APPLICATION

This application is a continuation-in-part (CIP) application of PCT/CN2020/107758, filed on Aug. 7, 2020, the disclosure of which is incorporated herein in its entirety by reference.

FIELD OF THE INVENTION

The present invention relates to a nailing device.

DESCRIPTION OF THE PRIOR ART

Nail guns are commonly used nailing tools, which use power to sequentially drive a plurality of nails stored therein to an object to be nailed. The nail guns are tools commonly used for decoration and floor pavement, and they usually need a stable nailing during use, especially in the case of flange edge nailing, one will encounter situations of nailing at various angles, such as in the case of floor pavement, it is necessary to perform nailing along a flange of a flooring, which has strict requirements for nailing angles. However, hand-held nail guns have problems in holding, and it is impossible to maintain a fixed nailing posture. If the consistency of the nailing angle cannot be ensured, the nailing is misplaced, the connection is not firm, and the flooring flange may even be cracked, causing the flooring to be scrapped. The commonly used nail guns cannot be adapted to the nailing of floorings with different thicknesses, but only to one specification, or only to the nailing in the same position, and cannot adjust the nailing position, which is inconvenient to use.

SUMMARY OF THE INVENTION

To overcome the deficiencies in the prior art, one of the objectives of the present invention is to provide a nailing device, which is convenient to use.

In order to achieve the above objective, the present invention is implemented by the following technical solution:

a nailing device, characterized by comprising:

a nail gun having a nail ejection portion, the nail ejection portion being used to provide a nail ejection channel to drive a nail out; and a support frame having a support surface, wherein the support frame is used to support the nail gun; and the support frame is adjustably connected to the nail gun.

According to a technical solution of the present invention, in addition to driving the nail out of the nail gun through the nail ejection channel in a nail ejection direction, a position where the support frame is connected to the nail gun is adjustable in the nail ejection direction or in a direction opposite to the nail ejection direction.

According to a technical solution of the present invention, the nail gun is provided with a plurality of marking lines arranged at intervals, and the marking lines are used to indicate a relative position between the support frame and the nail gun.

According to a technical solution of the present invention, the support frame is capable of covering part or all of the marking lines when the position where the support frame is connected to the nail gun is adjusted.

According to a technical solution of the present invention, the marking lines are arranged on the nail ejection portion.

According to a technical solution of the present invention, the support frame is connected to the nail ejection portion and is connected to a position which is adjustable.

According to a technical solution of the present invention, the support frame is provided with a through hole, and the nail ejection portion passes through the through hole.

According to a technical solution of the present invention, the nail ejection portion comprises a nail ejection tube and a guide block, the guide block protruding from the nail ejection tube; and the support frame is sleeved on the guide block slidably along the guide block.

According to a technical solution of the present invention, the guide block extends from the nail ejection tube and protrudes forward from the nail ejection tube, and the guide block also protrudes from the nail ejection tube toward at least one side.

According to a technical solution of the present invention, there are also provided a plurality of marking lines, which are arranged on the guide block at intervals.

According to a technical solution of the present invention, the nailing device further comprises a connecting member which connects the support frame to the nail gun, and is capable of adjusting the position where the mounting frame is connected to the nail gun.

According to a technical solution of the present invention, the connecting member is movably arranged on the support frame, the support frame is disconnected from the nail gun after the connecting member is moved, and the connecting member is arranged to be returnable in position.

According to a technical solution of the present invention, the nailing device further comprises an elastic device which provides an elastic force, wherein the elastic force causes the connecting member to connect the support frame to the nail gun; and the elastic device is capable of making the connecting member return in position after the connecting member is moved.

According to a technical solution of the present invention, the connecting member is configured as a shifting lever, a connecting block, a knob or a cam, wherein the shifting lever is rotatably mounted on the support frame, the nail gun is provided with a plurality of first toothed grooves, and the plurality of first toothed grooves are arranged along a movement direction of the support frame; one end of the shifting lever is embedded into the first toothed groove to connect the support frame to the nail gun, and the other end of the shifting lever is arranged freely; the elastic device is a first elastic device disposed on the support frame, the first elastic device provides an elastic force, and the elastic force causes the shifting lever to have one end kept embedded into the first toothed groove; or at least one raised tooth is provided on the connecting block; the gun body is provided with a plurality of second toothed grooves arranged along the movement direction of the support frame; the raised tooth is embedded into the second toothed groove to connect the support frame to the gun body; the connecting block is movable perpendicular to a nail ejection direction; after the connecting block is moved, the raised tooth is withdrawn from the second toothed groove; the elastic device is a second elastic device which provides an elastic force, and the elastic force causes the connecting block to have the raised tooth kept embedded into the second toothed groove, and/or the knob is arranged on the support frame movably in a direction perpendicular to the nail ejection direction, and the knob is capable of abutting against the nail ejection portion; the knob abuts against the nail ejection portion to connect the support frame to the nail ejection portion; or the cam is rotatably mounted on the support frame, and the cam is capable of abutting against and releasing the abutment from the nail ejection portion during rotation; and the cam abuts against the nail ejection portion to connect the support frame to the nail ejection portion.

According to a technical solution of the present invention, the nail ejection portion comprises a nail ejection tube and a guide block, the guide block protruding from the nail ejection tube; and the first toothed grooves, the second toothed grooves or third toothed grooves are arranged on the guide block.

According to a technical solution of the present invention, the support frame is provided with a first shaft, and the shifting lever is rotatable about the first shaft; the support frame is provided with an accommodating hole and an opening, the opening is in communication with the accommodating hole, part of the nail ejection portion is inserted into the accommodating hole, and one end of the shifting lever is capable of passing through the opening and being embedded into the first toothed groove.

According to a technical solution of the present invention, the connecting block is provided with a pin, and the pin is movably arranged on the support frame; the second elastic device is a compression spring, which is sleeved on the pin, and has one end abutting against the support frame and the other end abutting against the connecting block; and when the pin moves, the connecting block is driven to move, and the compression spring is capable of making the pin and the connecting block return in position.

According to a technical solution of the present invention, in a movement direction of the raised tooth, a groove is provided on one side of the second toothed groove, and the raised tooth faces the groove after being withdrawn from the second toothed groove.

According to a technical solution of the present invention, the first elastic device is a torsion spring, and the second elastic device and a third elastic device are both cylindrical springs.

According to a technical solution of the present invention, the knob is a threaded fastener, which is in threaded fit with the support frame, and the threaded fastener passes through the support frame and abuts against the nail ejection portion.

In the nailing device of the present invention, the support frame is used to support the nail gun, and can stably support the nail gun in a nailing state. The position where the support frame is mounted on the nail gun can be adjusted, such that the nail gun can be applied to objects to be nailed with different thicknesses. For the same object to be nailed, the nailing position of the nail gun can be adjusted, which is convenient to use.

Compared with the prior art, the nailing device proposed in the present invention has at least the following advantages:

1. after the support frame is connected to the nail gun, it is possible to help the nail gun to stably perform inclined nailing, and it can be used as a nail gun for nailing a flooring;
2. the support frame and the nail gun may be in a quick-change connection, which is convenient to use; 3. the position where the support frame is connected to the nail gun is adjustable, which is applicable to edge nailing of plates with different thicknesses, and the scope of application is enlarged; and 4. the nailing device of the present invention has a simple structure and low production costs, and is economical and practical.

DETAILED DESCRIPTION OF THE PREFERRED EMBODIMENTS

Embodiment 1

Figure 1:
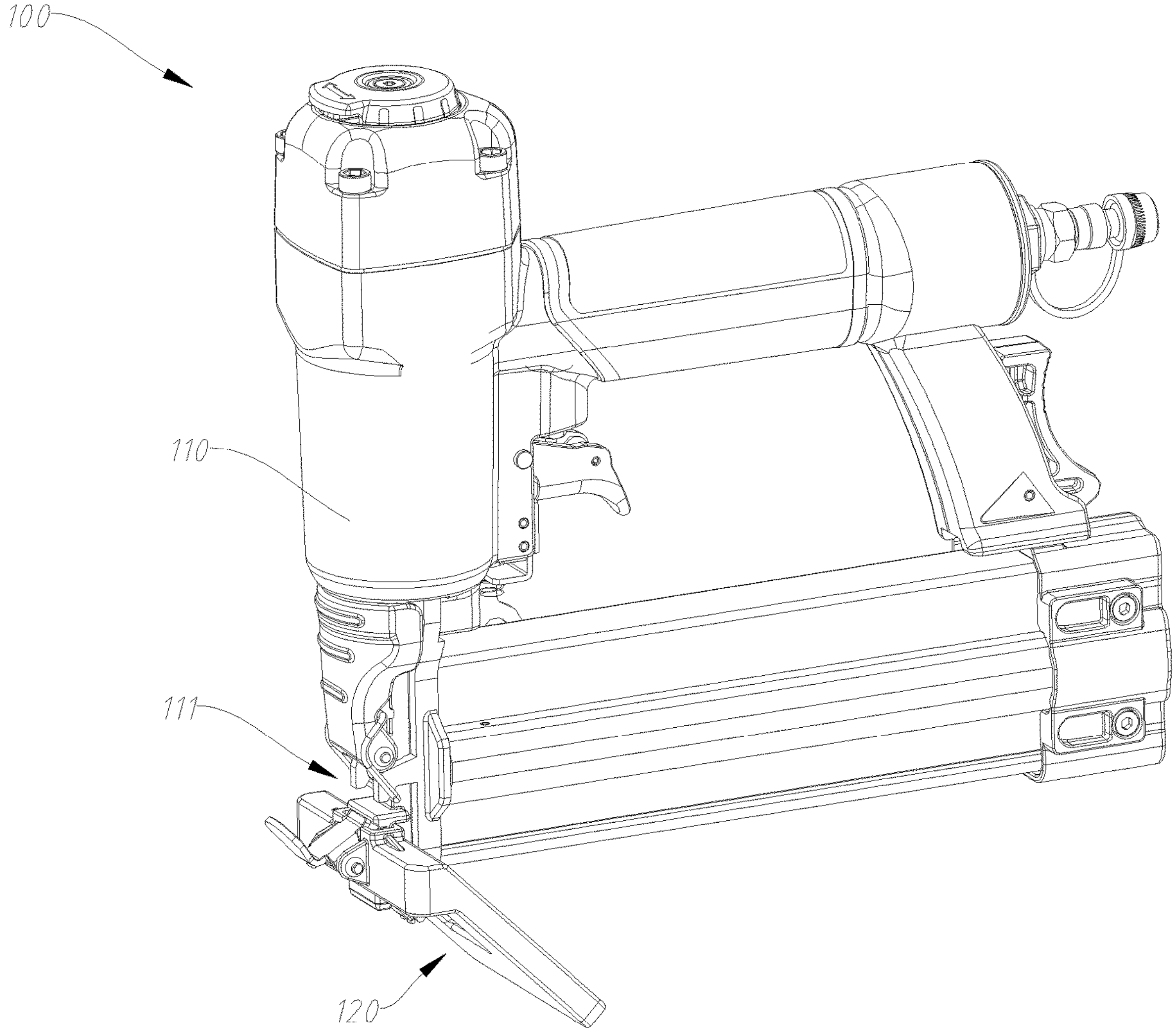
FIG. 1 is a schematic structural diagram of a nailing device in Embodiment 1 of the present invention.
Figure 2:
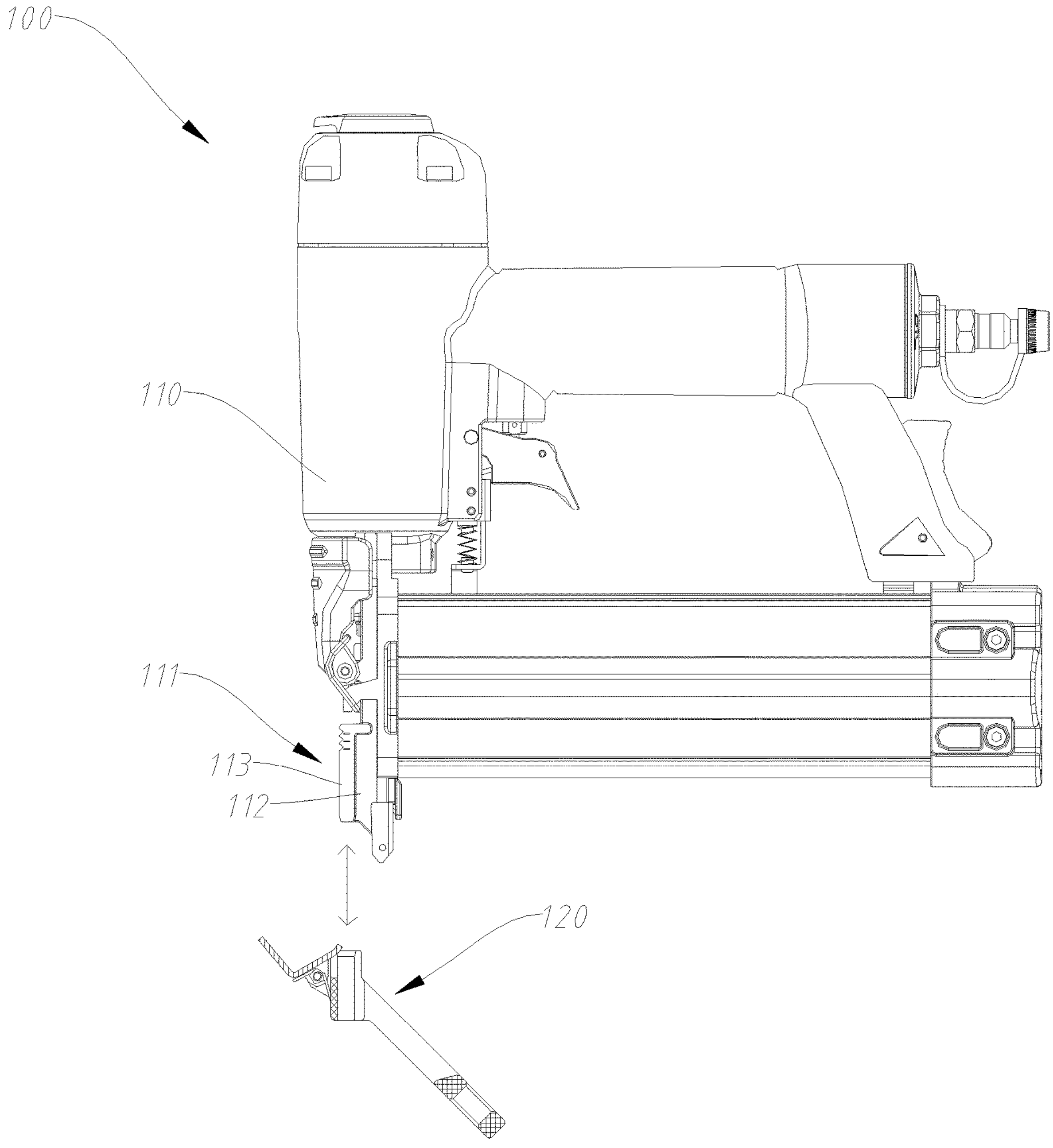
FIG. 2 is a schematic diagram of the assembly and disassembly of a nail gun and a support frame in the nailing device in Embodiment 1 of the present invention, in which the support frame is shown in a cross-sectional view.
Figure 3:
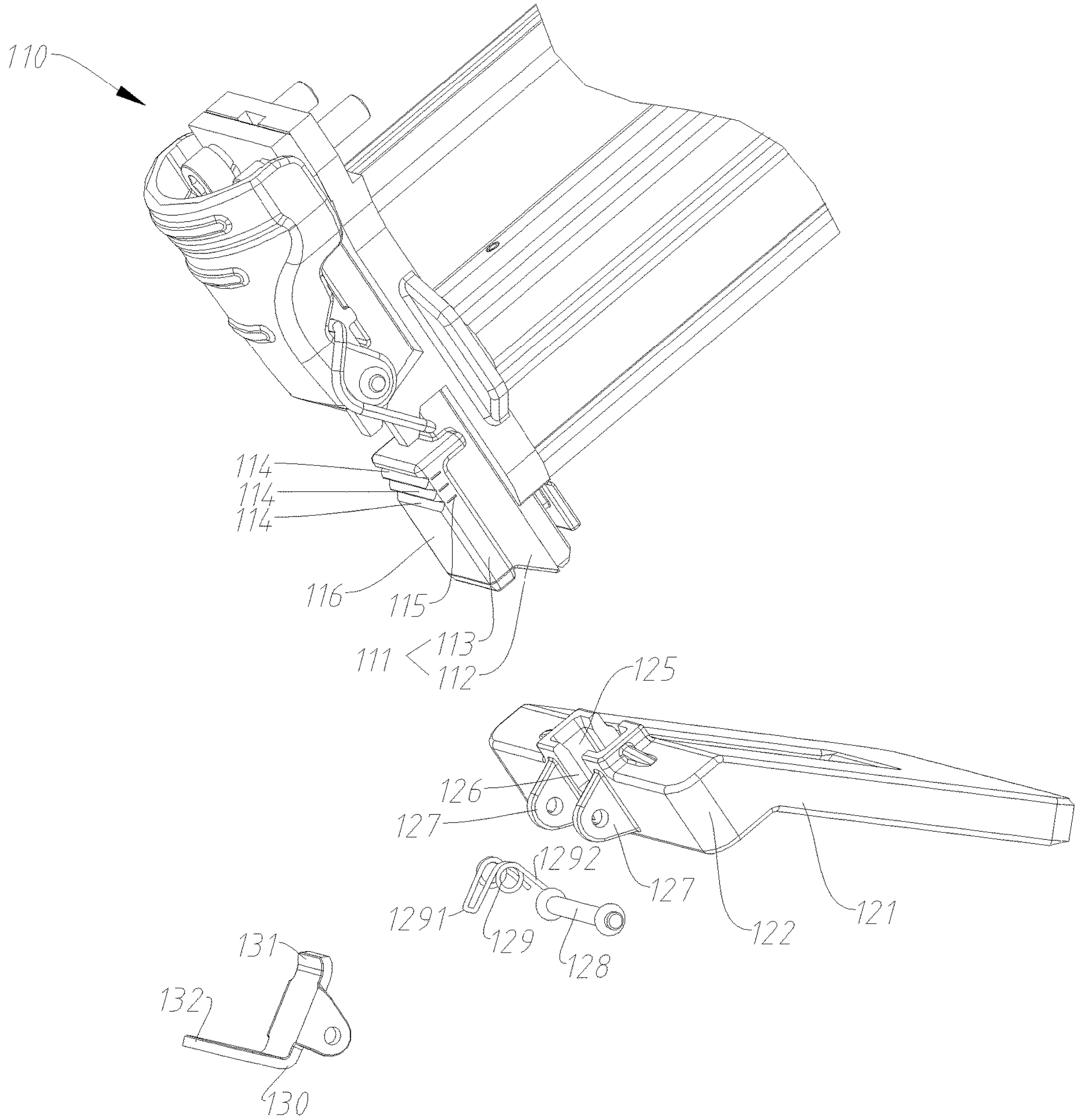
FIG. 3 is a schematic structural diagram of the nail gun partially separated from the support frame in Embodiment 1 of the present invention.

As shown in FIGS. 1 to 3, a nailing device 100 is configured to comprise a nail gun 110 and a support frame 120. The nail gun 110 is used for nailing, and its structure may be that of a nail gun in the prior art. The nail gun 110 has a nail ejection portion 111. The nail ejection portion 111 provides a nail ejection channel (not shown in the figures), and a nail is driven out of the nail gun 110 from the nail ejection channel in a nail ejection direction. The nail ejection direction is defined by the nail ejection channel, which is generally a linear direction. Taking FIG. 2 as a reference, the nail ejection direction is vertically downward. The arrow in FIG. 2 represents the movement direction of the support frame 120.

Figure 4:
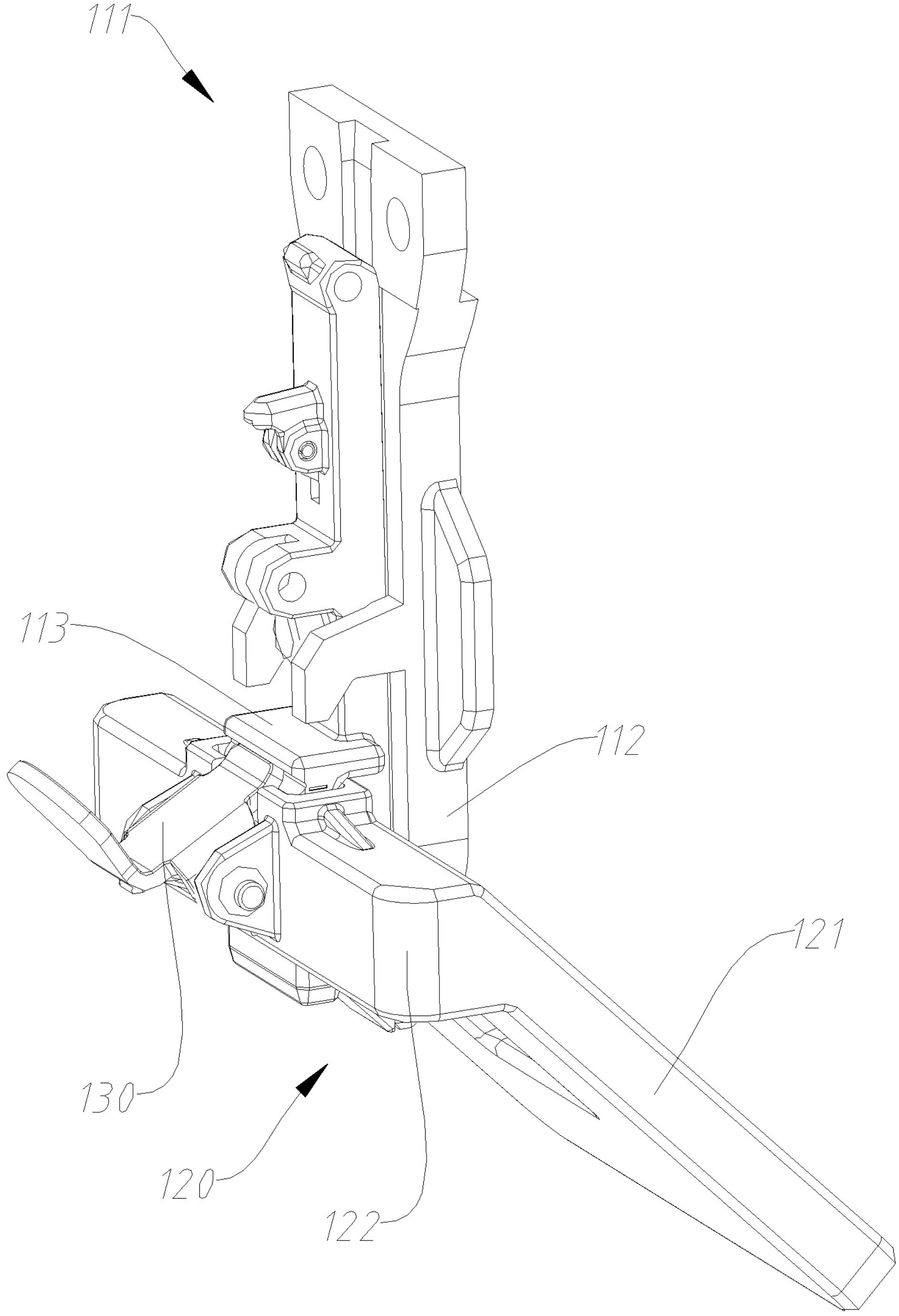
FIG. 4 is a schematic diagram of the mating relationship between a nail ejection portion and the support frame in Embodiment 1 of the present invention.

As shown in FIGS. 3 and 4, the nail ejection portion 111 comprises a nail ejection tube 112 and a guide block 113. The nail ejection channel is provided on the nail ejection tube 112. The guide block 113 is used to help mount the support frame 120 and guide the support frame 120 when the position thereof is adjusted. The guide block 113 is configured to protrude from the nail ejection tube 112. In the example shown in FIG. 2, the side view of the guide block 113 is an inverted L shape, that is, a side face thereof has an inverted L shape. The guide block 113 extends from the nail ejection tube 112 and protrudes forward from the nail ejection tube 112, and the forward direction is leftward with reference to FIG. 2. The guide block 113 also protrudes from the nail ejection tube 112 toward at least one side. In the example shown in the figure, the guide block 113 protrudes from the nail ejection tube 112 toward two sides. The forward direction refers to the leftward direction with reference to FIG. 2, and one side or two sides refers to the directions perpendicular to the paper with reference to FIG. 2. A front surface 116 of the guide block 113 is provided with first toothed grooves 114. The first toothed groove 114 is used to cooperate with a shifting lever 130, which will be described below, for fixing the support frame 120. The number of the first toothed grooves 114 is plural, and they are arranged along the nail ejection direction. The number of the first toothed grooves 114 may be determined according to the moving distance of the support frame 120. Marking lines 115 are provided on the side face of the guide block 113. The number of the marking lines 115 is plural, and the plurality of marking lines 115 are arranged at intervals along the nail ejection direction. The marking lines 115 are used to indicate the relative position between the support frame 120 and the nail gun 110, that is, the position where the support frame 120 is connected to the nail gun 110, which is convenient for a worker to identify.

Figure 5:
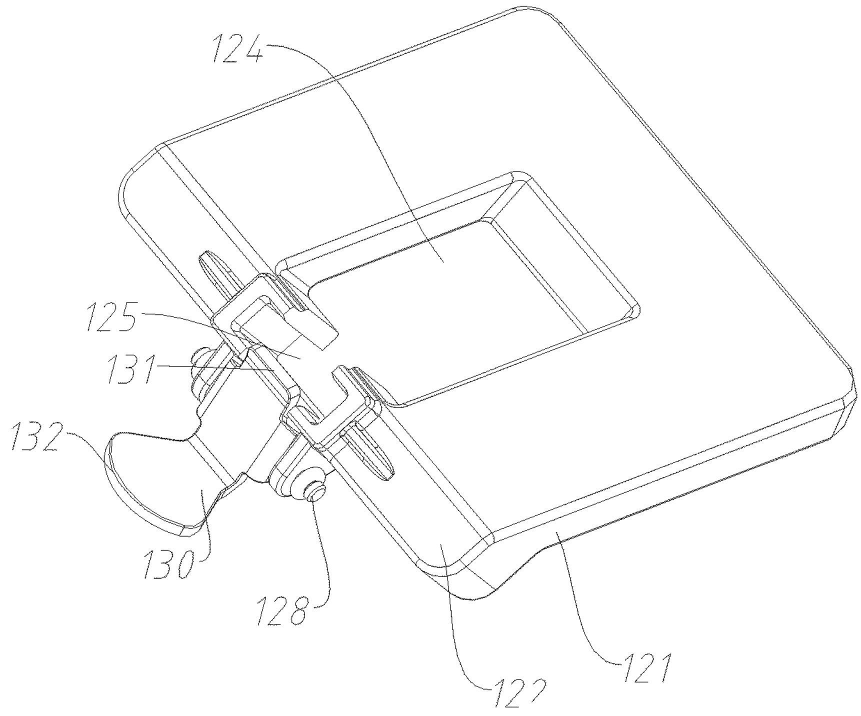
FIG. 5 is a schematic structural diagram of the support frame in Embodiment 1 of the present invention.
Figure 6:
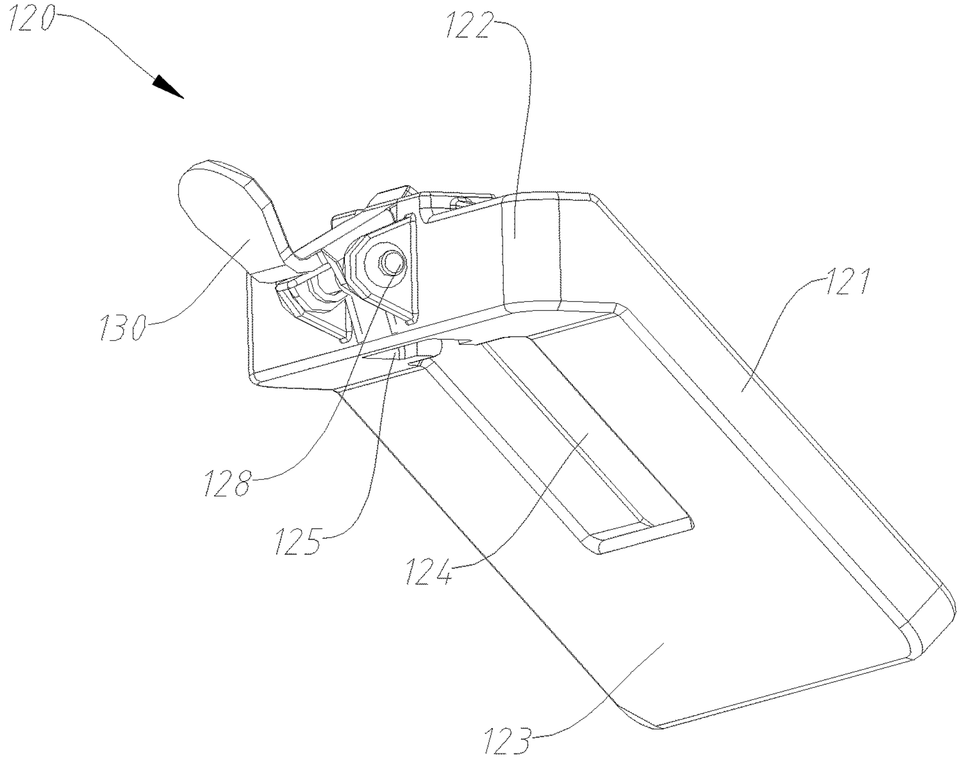
FIG. 6 is a schematic structural diagram of the support frame in Embodiment 1 of the present invention viewed from another angle.
Figure 7:
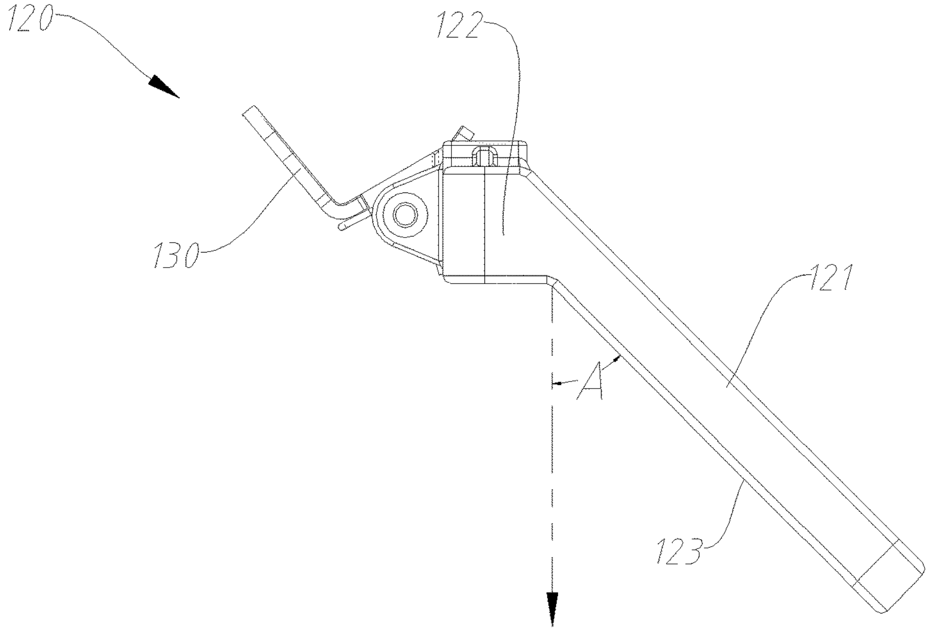
FIG. 7 is a side view of the support frame in Embodiment 1 of the present invention.
Figure 8:
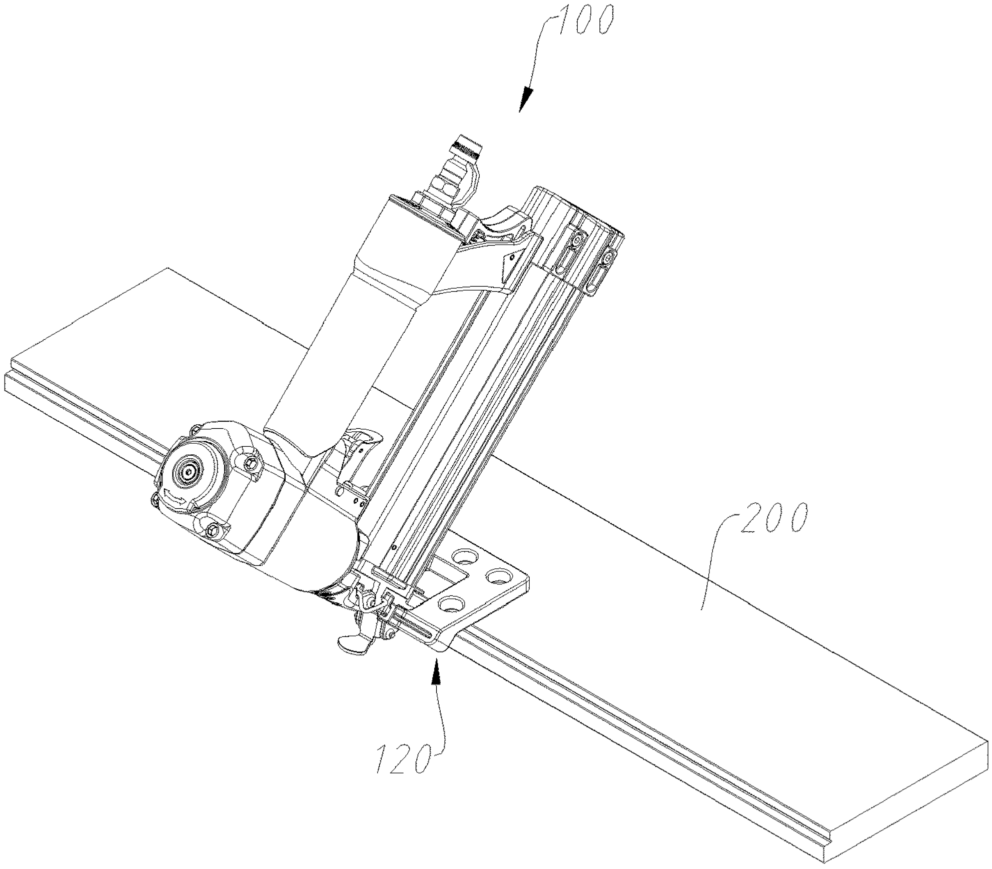
FIG. 8 is a schematic diagram of the nailing device in a use state in Embodiment 1 of the present invention.

As shown in FIGS. 3, 5 and 6, the support frame 120 is configured to comprise a first plate portion 121 and a second plate portion 122. The first plate portion 121 is used to come into contact with an object to be nailed or a support structure and support the nail gun 110. The first plate portion 121 is provided with a support face 123. The support surface 123 is in contact with the object to be nailed or the support structure. The shape of the support surface 123 is adapted to a surface of the object to be nailed or the support structure, and is suitable for being in contact with, preferably in surface contact with the object to be nailed or the support structure. For example, when the object to be nailed is a flooring, a surface of the flooring that comes into contact with the support frame 120 is a flat surface, so the support surface 123 is also a flat surface. When the first plate portion 121 comes into contact with the flooring, the support surface 123 comes into contact with the surface of the flooring. The first plate portion 121 is also provided with a through hole 124. The through hole 124 is used to receive the nail ejection tube 112 for allowing same to pass through. As shown in FIG. 7, an included angle A between the support surface 123 and the nail ejection direction is an acute angle or a right angle. In FIG. 7, the arrow represents the nail ejection direction.

The second plate portion 122 is used to cooperate with the guide block 113 and is connected to the nail ejection portion 111. An accommodating hole 125 is provided in the second plate portion 122. The accommodating hole 125 is used to cooperate with the guide block 113, and the second plate portion 122 is sleeved on the guide block 113 such that the support frame 120 can slide along the guide block 113. The shape of the accommodating hole 125 is adapted to that of the guide block 113. The accommodating hole 125 penetrates the second plate portion 122 in the nail ejection direction. The second plate portion 122 is further provided with an opening 126. The opening 126 is in communication with the accommodating hole 125 such that the shifting lever 130 described below passes through the opening 126 and comes into contact with the guide block 113. Two lugs 127 are provided on the second plate portion 122. The two lugs 127 are respectively disposed on two sides of the opening 126. Two ends of a shaft 128 are inserted into the two lugs 127. The second plate portion 122 is disposed at an end portion of the first plate portion 121, and the two are configured to be integrally formed.

The shifting lever 130 is sleeved on the shaft 128 rotatably about the shaft 128. The shaft 128 passes through the shifting lever 130. A torsion spring 129 is further sleeved on the shaft 128. One leg 1291 of the torsion spring 129 abuts against the shifting lever 130, and the other leg 1292 thereof abuts against the second plate portion 122. The torsion spring 129 provides an elastic force, and the elastic force 129 keeps the shifting lever 130 in a desired position.

Figure 9:
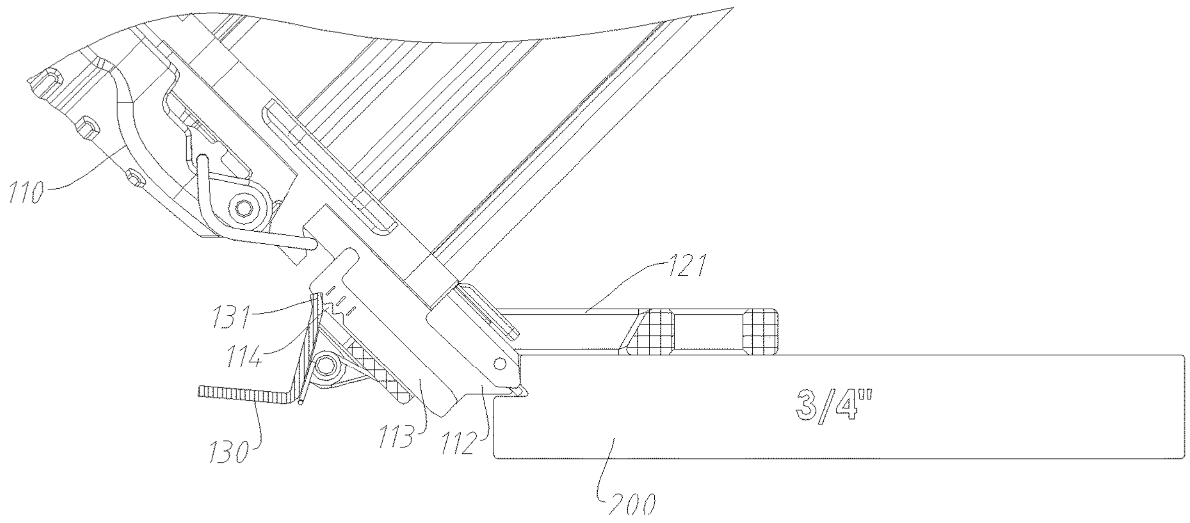
FIG. 9 is a schematic diagram of the nailing device in a use state in Embodiment 1 of the present invention, in which the support frame is shown in a cross-sectional view.
Figure 10:
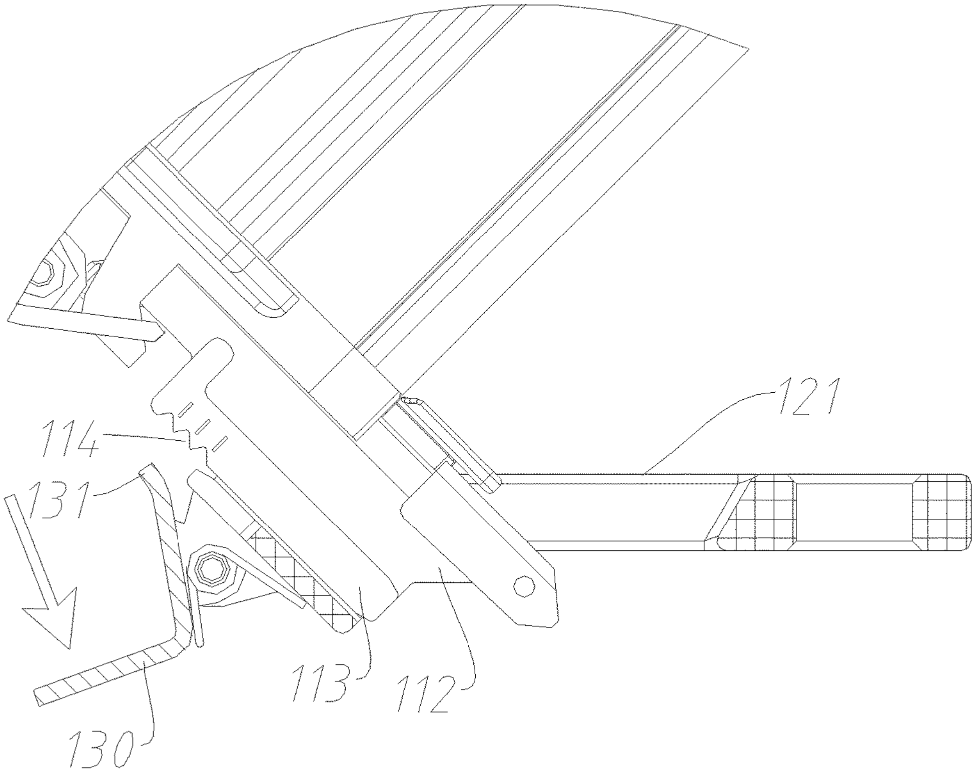
FIG. 10 is a schematic diagram of the mating relationship between the support frame and the nail ejection portion in Embodiment 1 of the present invention, in which the support frame is shown in a cross-sectional view.
Figure 11:
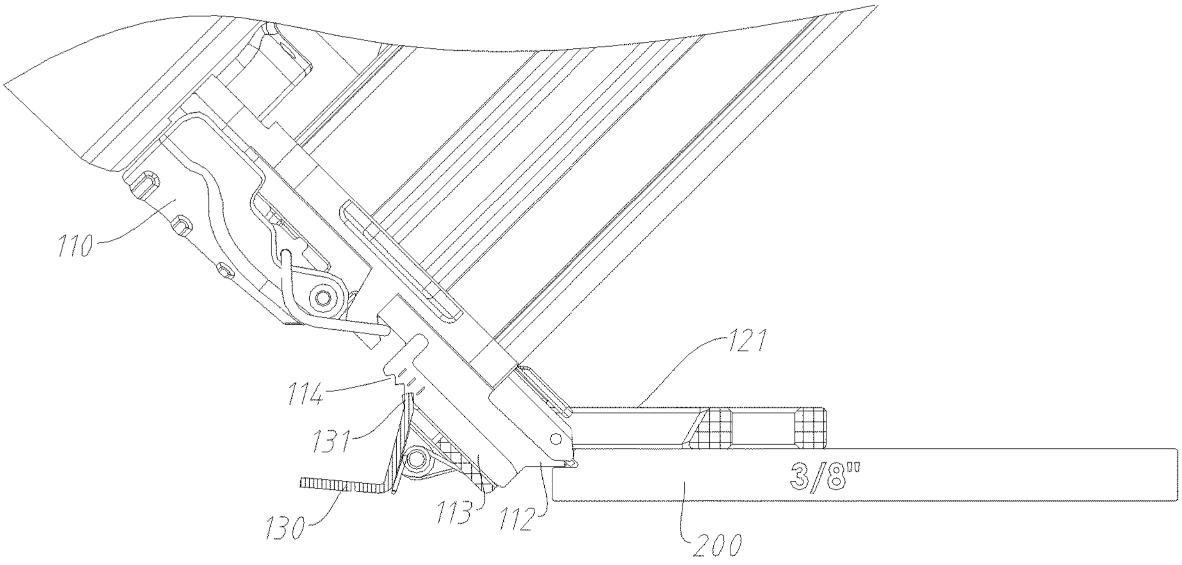
FIG. 11 is a schematic diagram of the nailing device in another use state in Embodiment 1 of the present invention, in which the support frame is shown in a cross-sectional view.

As shown in FIGS. 8 to 11, when the support frame 120 is connected to the nail gun 110, the nail ejection tube 112 passes through the through hole 124, and the guide block 113 passes through the accommodating hole 125. The support frame 120 is sleeved on the guide block 113 slidably along the guide block 113. One end 131 of the shifting lever 130 is embedded into one of the first toothed grooves 114 to connect the support frame 120 to the nail ejection portion 111. After the one end 131 of the shifting lever is embedded into the first toothed groove 114, the support frame 120 can be restricted from changing the position thereof relative to the nail ejection portion 111. The other end 132 of the shifting lever 130 is arranged freely and is suitable for being shifted by a worker. The elastic force of the torsion spring 129 keeps the one end 131 of the shifting lever 130 embedded into the first toothed groove 114. When nailing, the support surface 123 of the support frame 120 is attached to the surface of the flooring 200 to support the nail gun 110, and the nail gun 110 drives a nail out of the nail ejection tube 112 to the flooring 200. FIG. 9 shows a state of nailing a relatively thick flooring 200, wherein the flooring 200 has a thickness of ¾ inch. As shown in FIG. 10, when the position where the support frame 120 is connected to the nail gun 110 is adjusted, the shifting lever 130 is shifted such that one end 131 thereof moves out of the first toothed groove 114, and the support frame 120 is then moved in the nail ejection direction or in a direction opposite to the nail ejection direction to change the relative position between the support frame 120 and the nail ejection portion 111. The support frame 120 covers part or all of the marking lines 115 during the movement. The position of the support frame 120 can be determined according to the exposed marking lines 115. When the support frame 120 just covers all the marking lines 115, the support frame 120 moves to the top position. After the support frame 120 moves into position, the other end 132 of the shifting lever 130 is released. The shifting lever 130 is returned in position under the action of the elastic force of the torsion spring 129, and the one end 131 of the shifting lever is embedded into another first toothed groove 114 to limit the support frame 120 at this position. At this point, the shifting lever 130 connects the support frame 120 to the nail ejection portion 111 at a new position. As shown in FIG. 11, after the position where the support frame 113 is connected to the nail ejection portion 111 is adjusted, the nail gun 110 is suitable for being in a state of nailing a thinner flooring 200, wherein the flooring 200 has a thickness of ⅜ inch.

In this embodiment, the shifting lever 130 is an embodiment of a connecting member. The torsion spring 129 is an embodiment of a first elastic device, which can be replaced by another component with the same function. The structure of the support frame 120 is not limited to the structure of the first plate portion 121 and the second plate portion 122.

Embodiment 2

Figure 12:
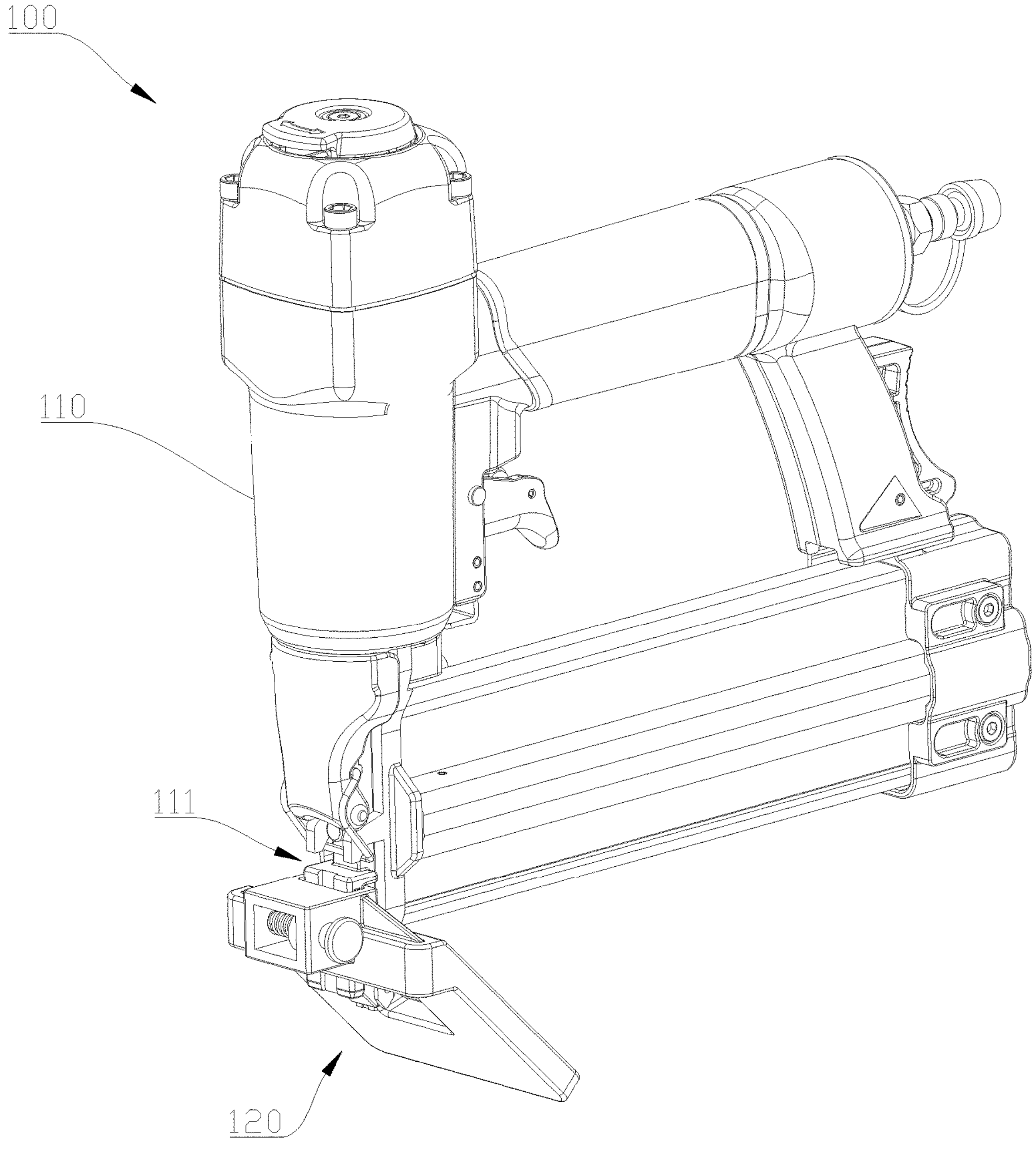
FIG. 12 is a schematic structural diagram of a nailing device in Embodiment 2 of the present invention.
Figure 13:
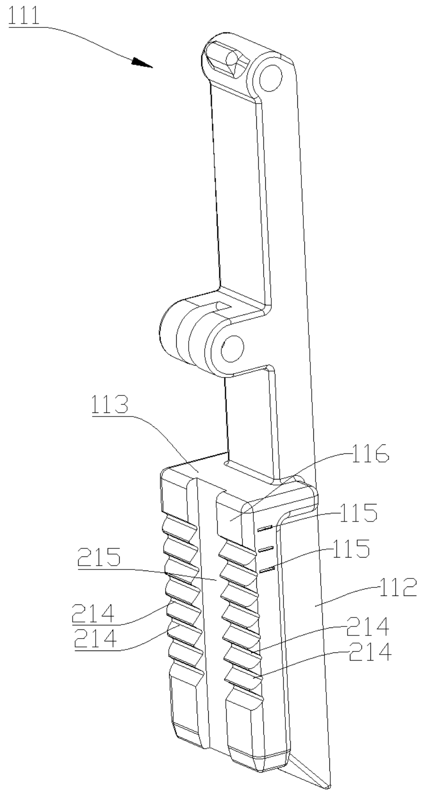
FIG. 13 is a schematic diagram of a nail ejection portion in Embodiment 2 of the present invention.

As shown in FIGS. 12 and 13, the difference between this embodiment and Embodiment 1 is that the front surface 116 of the guide block 113 is provided with a groove 215, and a row of second toothed grooves 214 are provided on either side of the groove 215. There are multiple second toothed grooves 214 in each row, which are arranged along the nail ejection direction. The number of the second toothed grooves 214 may be determined according to the moving distance of the support frame 120.

Figure 14:
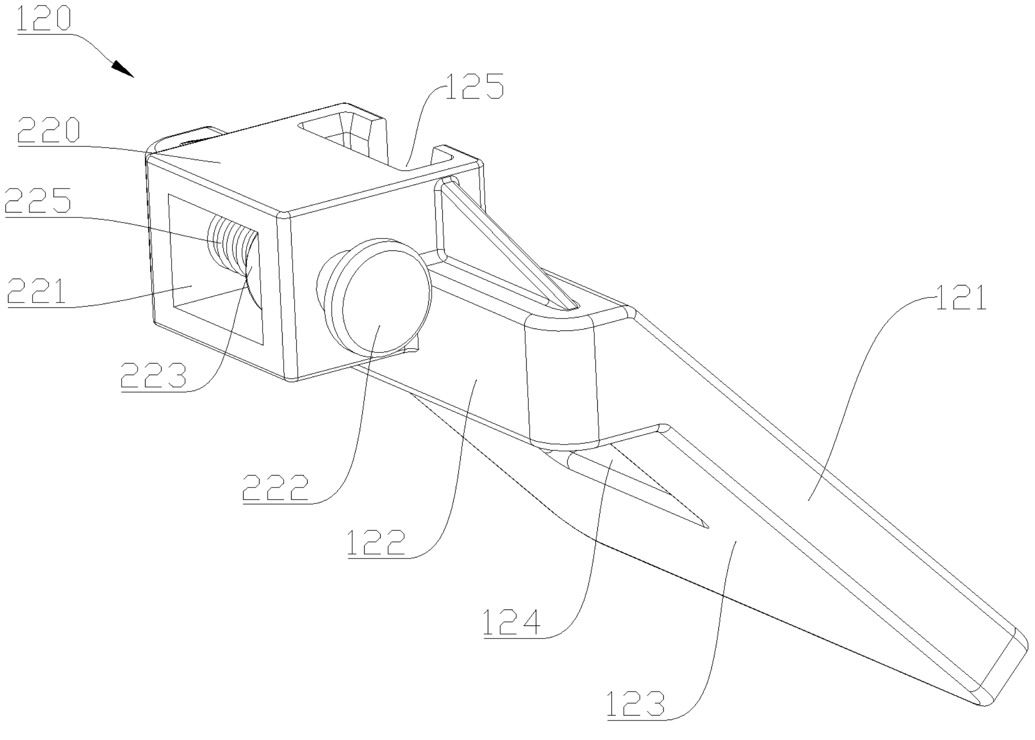
FIG. 14 is a schematic structural diagram of a support frame in Embodiment 2 of the present invention.
Figure 15:
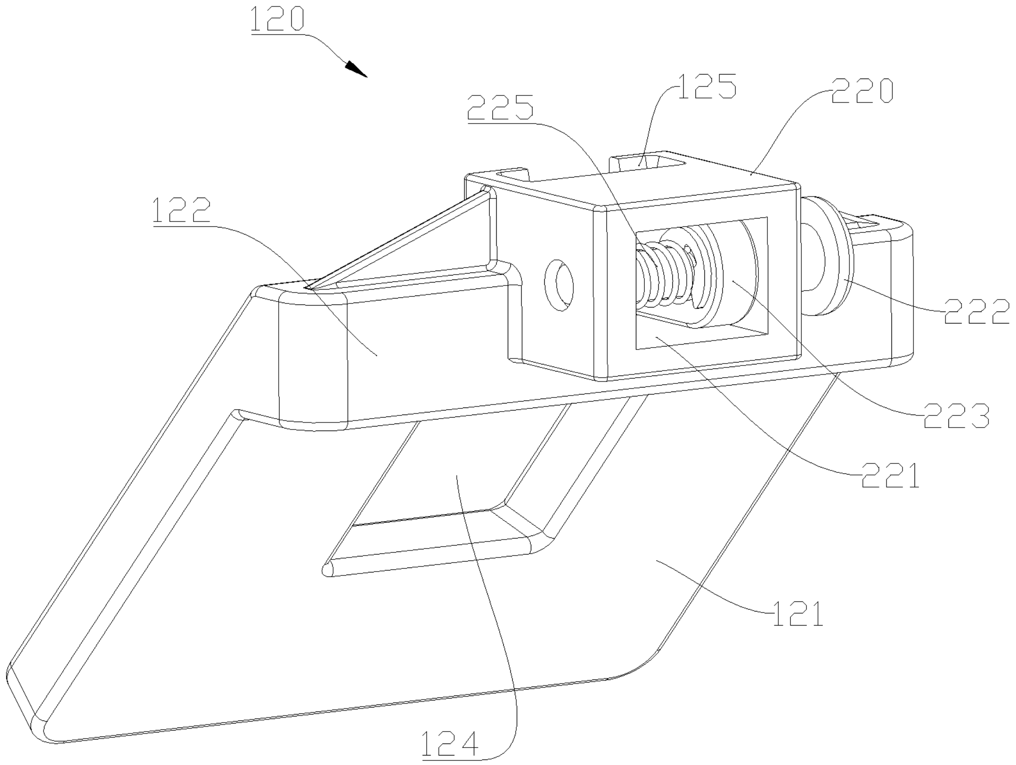
FIG. 15 is a schematic structural diagram of the support frame in Embodiment 2 of the present invention viewed from another angle.
Figure 16:
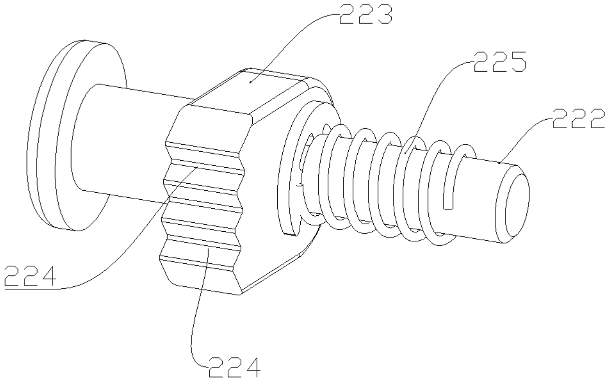
FIG. 16 is a schematic structural diagram of a connecting block in Embodiment 2 of the present invention.

As shown in FIGS. 14, 15 and 16, the support frame 120 comprises the first plate portion 121 and the second plate portion 122 as described in Embodiment 1. In this embodiment, no lug 127 is provided on the second plate portion 122. In this embodiment, a protective shell 220 is provided on the second plate portion 122. The protective shell 220 is provided with a penetrating hole 221. The penetrating hole 221 extends in a direction perpendicular to the nail ejection direction, penetrates the protective shell 220 and is in communication with the accommodating hole 125. A pin 222 is inserted into the protective shell 220. The pin 222 is configured to be movable in a direction perpendicular to the nail ejection direction. A movable connecting block 223 is provided in the penetrating hole 221. The connecting block 223 is sleeved on the pin 222. A raised tooth 224 is provided on the connecting block 223. There may be one raised tooth 224, or a plurality of raised teeth arranged along the nail ejection direction. In the example shown in the figure, a plurality of raised teeth 224 are arranged along the nail ejection direction. A compression spring 225 is sleeved on the pin 222. The compression spring 225 is located inside the penetrating hole 221. One end of the compression spring abuts against the protective shell 220, and the other end thereof abuts against the connecting block 223.

The remaining structure is the same as that in Embodiment 1.

Figure 17:
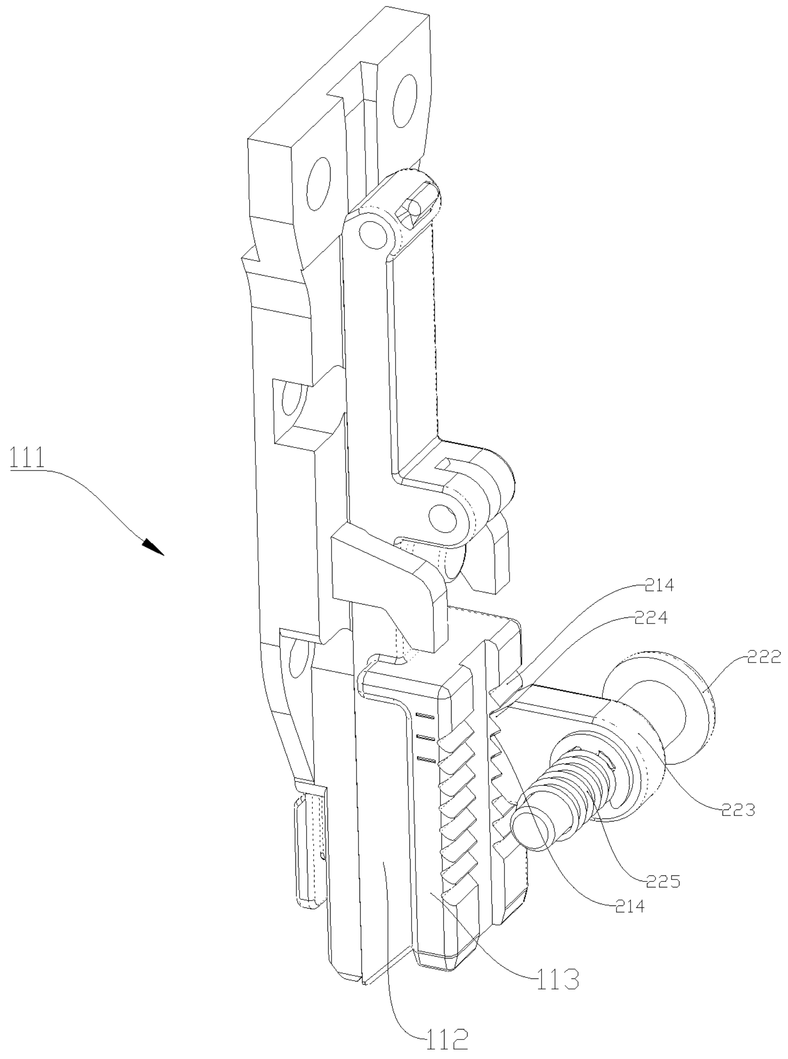
FIG. 17 is a schematic diagram of the mating relationship between the connecting block and the nail ejection portion in Embodiment 2 of the present invention.
Figure 18:
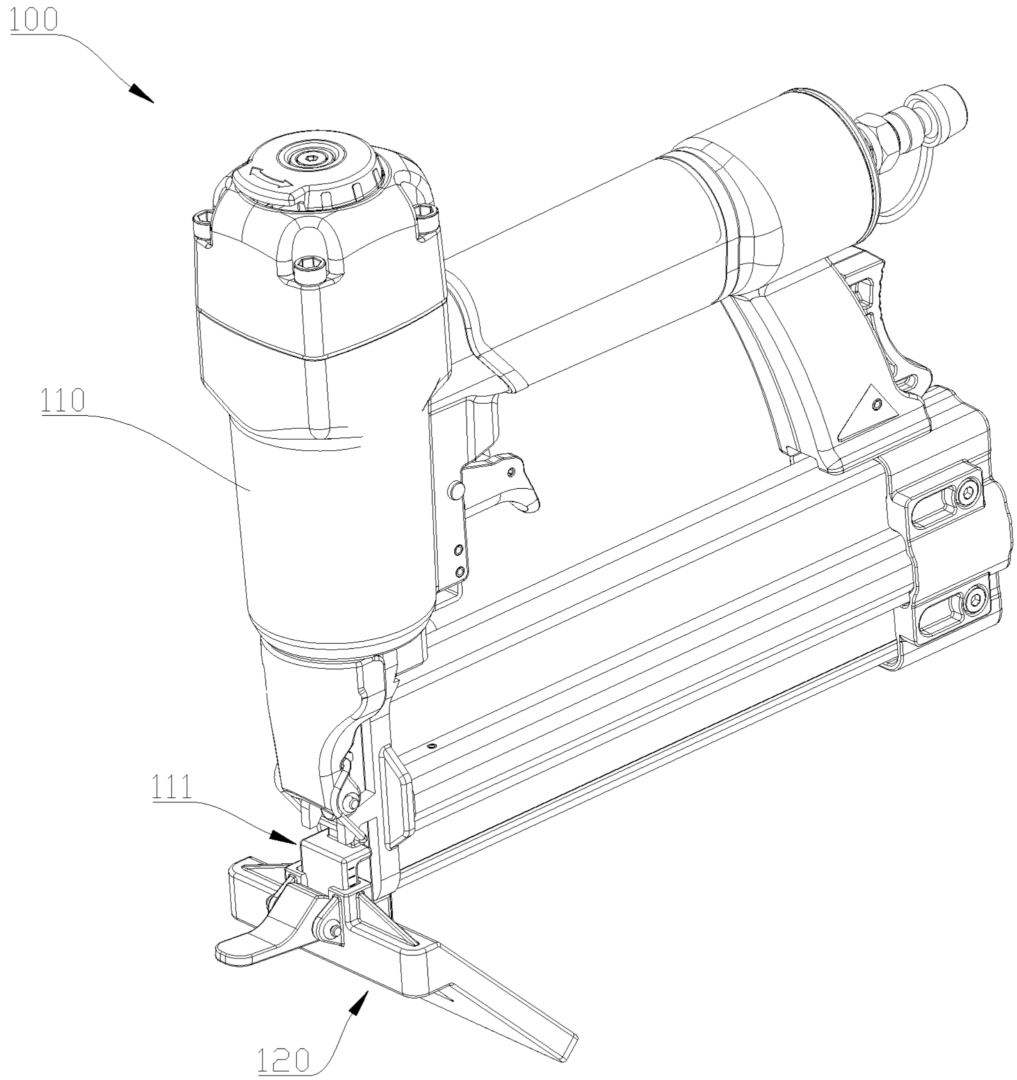
FIG. 18 is a schematic structural diagram of a nailing device in Embodiment 3 of the present invention.
Figure 19:
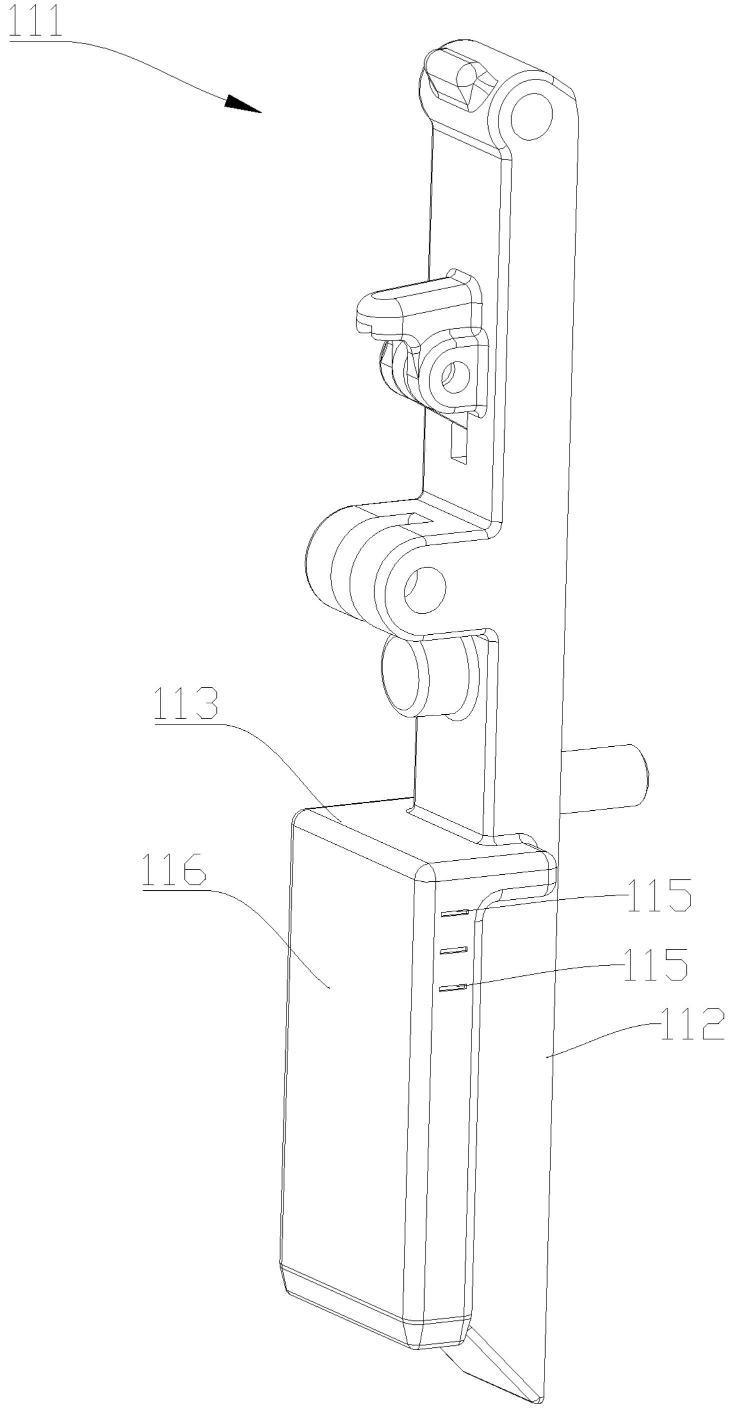
FIG. 19 is a schematic diagram of a nail ejection portion in Embodiment 3 of the present invention.
Figure 20:
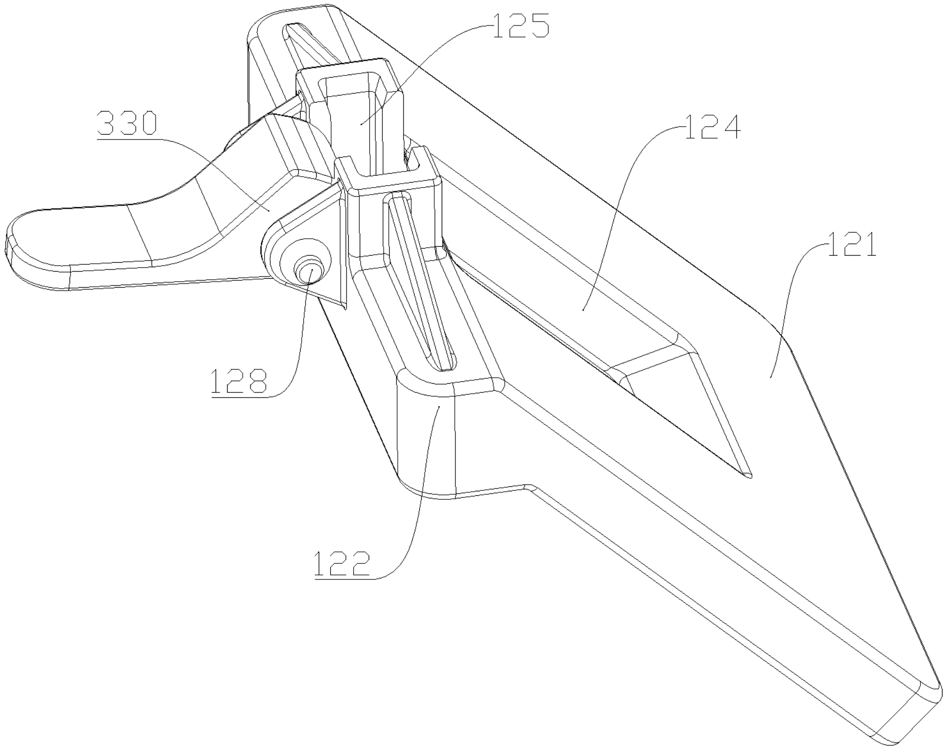
FIG. 20 is a schematic structural diagram of a support frame in Embodiment 3 of the present invention.
Figure 21:
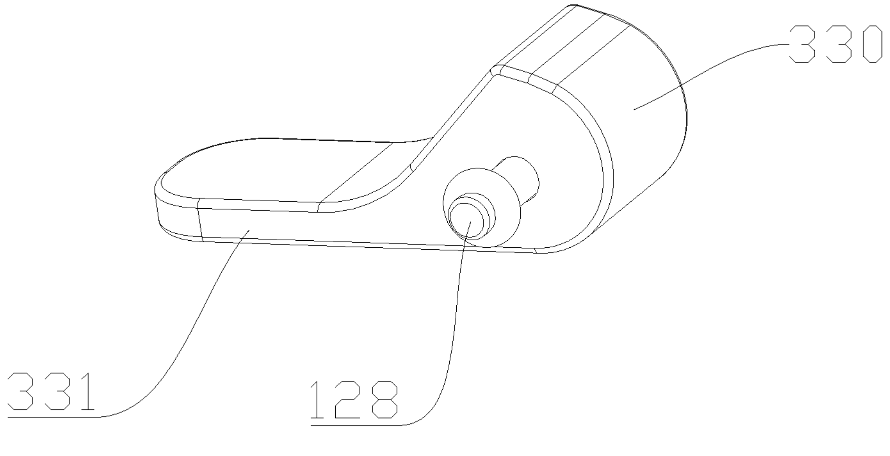
FIG. 21 is a schematic structural diagram of a cam in Embodiment 3 of the present invention.

As shown in FIG. 17, when this embodiment is in use, the plurality of raised teeth 224 are respectively embedded into the plurality of second toothed grooves 214 to engage the connecting block 223 with the guide block 113, so as to connect the support frame 120 and the nail ejection portion 111. The elastic force of the compression spring 225 causes the connecting block 223 to be kept in this state. The support frame 120 cannot move in the nail ejection direction at this time. When it is necessary to change the position where the support frame 120 is connected to the nail gun 110, the pin 222 is pushed to move the connecting block 223 in the direction perpendicular to the nail ejection direction, and the raised teeth 224 move out of the second toothed grooves 214 until they face the groove 215. Since there is provided a groove 215, the connecting block 223 and the guide block 113 have no engagement relationship, and the support frame 120 is disconnected from the nail ejection portion 111. The compression spring 225 is compressed and thus generates a greater elastic force. At this time, the support frame 120 can move in the nail ejection direction or in a direction opposite to the nail ejection direction so as to change the relative position between the support frame and the nail gun 110. After the support frame 120 is moved into position, the thrust on the pin 222 is released, the connecting block 222 is returned in position under the action of the elastic force of the compression spring 225, and the plurality of raised teeth 224 are re-embedded into the plurality of second toothed grooves 214.

In this embodiment, the compression spring 225 is one of the embodiments of the second elastic device, which can also be replaced by another component with the same function. The groove 215 is provided on one side of the second toothed grooves 214, and the raised teeth 224 move out of the second toothed grooves 214 to face the groove 215. This can avoid interference after the raised teeth 224 move out of the second toothed grooves 214, which affects the normal movement of the connecting block 223. As an alternative embodiment, it is also feasible to provide only one row of second grooves 214 on one side of the groove 215.

In this embodiment, the connecting block 223 is one of the embodiments of the connecting member.

Embodiment 3

As shown in FIGS. 18 to 21, the difference of Embodiment 1 is that the front surface 116 of the guide block 113 is not provided with the first toothed grooves 114. A cam 330 is sleeved on the shaft 128 of the support frame 120. The cam 330 is arranged rotatably about the shaft 128. The cam 330 is also connected to a handle 331. The cam 330 and the handle 331 are integrally formed.

The remaining structure is the same as that in Embodiment 1.

When this embodiment is in use, as the cam 330 rotates, an abutting force thereof to the guide block 113 will change. When the abutting force of the cam 330 to the guide block 113 is large enough, the support frame 120 can be maintained at a desired connection position. The cam 330 rotates to reduce its abutting force to the guide block 113, and the support frame 120 can move in the nail ejection portion 111. After moving into position, the cam 330 rotates to abut against the guide block 113, so as to keep the support frame 120 in this position.

In this embodiment, the cam 330 is one of the embodiments of the connecting member.

Embodiment 4

Figure 22:
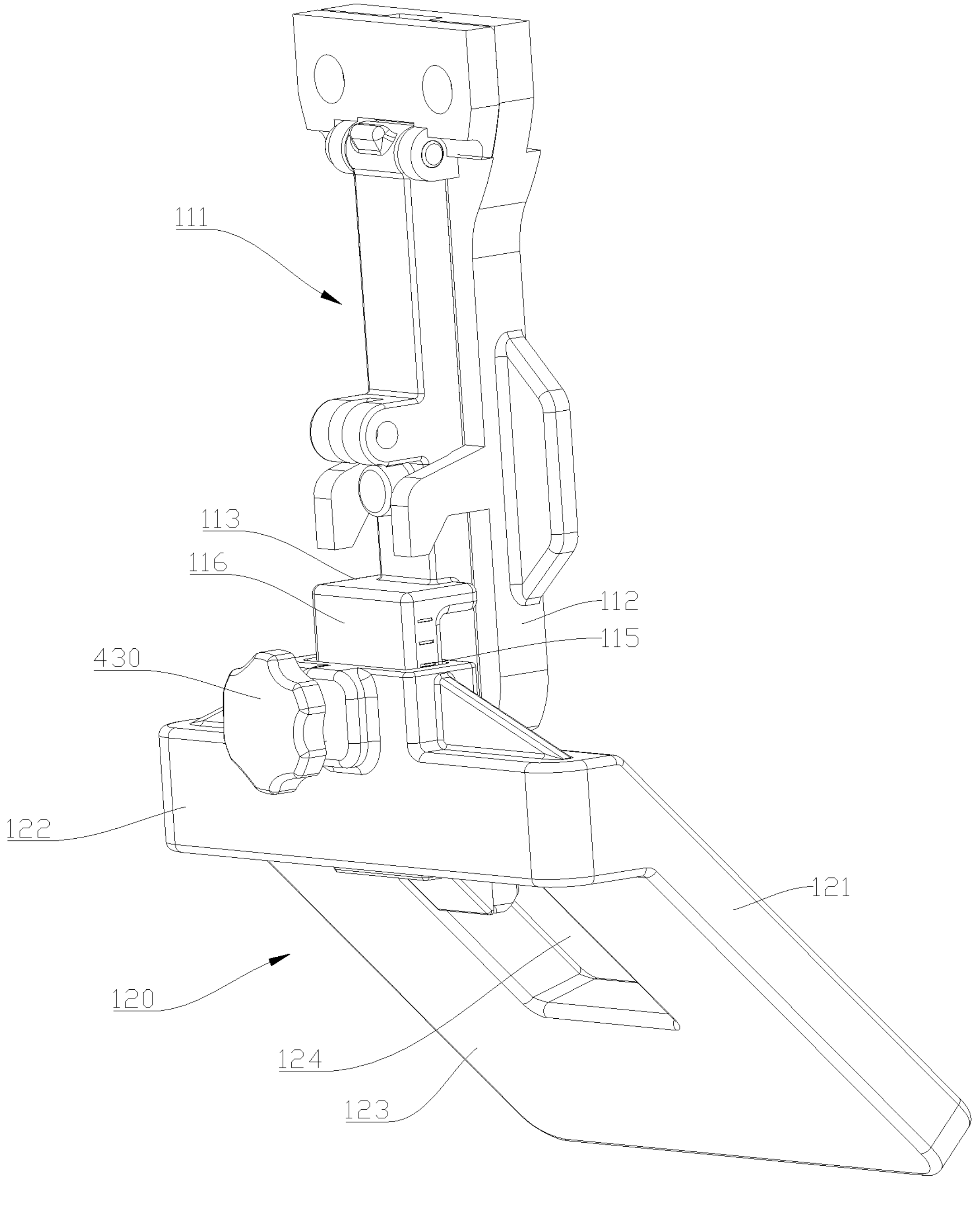
FIG. 22 is a schematic diagram of the mating relationship between a nail ejection portion and a support frame in Embodiment 4 of the present invention.
Figure 23:
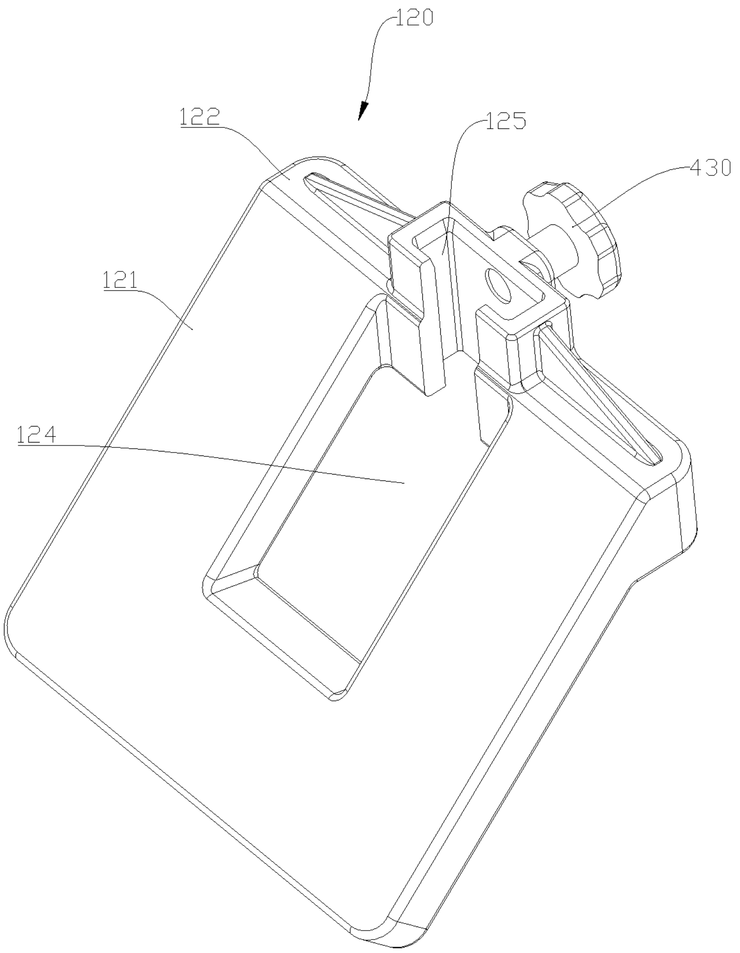
FIG. 23 is a schematic structural diagram of the support frame in Embodiment 4 of the present invention.

As shown in FIGS. 22 and 23, the difference between this embodiment and Embodiment 1 is that the front surface 116 of the guide block 113 is not provided with the first toothed grooves 114. The second plate portion 122 is also not provided with the opening 126. A threaded fastener 430 is screwed into the second plate portion 122. The threaded fastener 430 is rotatably provided. When the threaded fastener 430 rotates, it can move toward the guide block 113 until abutting against the guide block 113 tightly, such that the support frame 120 is fixed on the nail ejection portion 111 at a designated position. When the position of the support frame 120 needs to be adjusted, the threaded fastener 430 is unscrewed to reduce the abutting force of the threaded fastener 430 to the guide block 113, and the support frame 120 can move in the nail ejection direction. After the support frame 120 is moved into position, the threaded fastener 430 is tightened to make it abut against the guide block 113 tightly, so as to fix the support frame 120 at this position.

In this embodiment, the threaded fastener 430 is one of the embodiments of the connecting member.

Compared with the prior art, the nailing device proposed in the present invention has at least the following advantages:

1. after the support frame is connected to the nail gun, it is possible to help the nail gun to stably perform inclined nailing, and it can be used as a nail gun for nailing a flooring;
2. the support frame and the nail gun may be in a quick-change connection, which is convenient to use; 3. the position where the support frame is connected to the nail gun is adjustable, which is applicable to edge nailing of plates with different thicknesses, and the scope of application is enlarged; and 4. the nailing device of the present invention has a simple structure and low production costs, and is economical and practical.

The foregoing embodiments are not intended to restrict the present invention. However, the present invention is not restricted to the foregoing examples. Changes, variations, additions or replacements made by a person skilled in the art without departing from the scope of the technical solutions of the present invention all fall within the scope of protection of the present invention.

The invention claimed is:

1. A nailing device, comprising:

a nail gun having a nail ejection portion, the nail ejection portion being used to provide a nail ejection channel to drive a nail out; and a support frame having a support surface, wherein the support frame is used to support the nail gun; and the support frame is adjustably connected to the nail gun;

wherein the nail ejection portion comprises a nail ejection tube and a guide block, the guide block protruding from the nail ejection tube; and the support frame is sleeved on the guide block slidably along the guide block.

2. The nailing device according to claim 1, wherein, in addition to driving the nail out of the nail gun through the nail ejection channel in a nail ejection direction, a position where the support frame is connected to the nail gun is adjustable in the nail ejection direction or in a direction opposite to the nail ejection direction.

3. The nailing device according to claim 1, wherein the nail gun is provided with a plurality of marking lines arranged at intervals, and the marking lines are used to indicate a relative position between the support frame and the nail gun.

4. The nailing device according to claim 3, wherein the support frame is capable of covering part or all of the marking lines when a position where the support frame is connected to the nail gun is adjusted.

5. The nailing device according to claim 3, wherein the marking lines are arranged on the nail ejection portion.

6. The nailing device according to claim 1, wherein the support frame is connected to the nail ejection portion and is connected to a position which is adjustable.

7. The nailing device according to claim 1, wherein the support frame is provided with a through hole, and the nail ejection portion passes through the through hole.

8. The nailing device according to claim 1, wherein the guide block extends from the nail ejection tube and protrudes forward from the nail ejection tube, and the guide block also protrudes from the nail ejection tube toward at least one side.

9. The nailing device according to claim 1, wherein there are also provided a plurality of marking lines, which are arranged on the guide block at intervals.

10. The nailing device according to claim 1, further comprising a connecting member which connects the support frame to the nail gun, and is capable of adjusting a position where the support frame is connected to the nail gun.

11. The nailing device according to claim 10, wherein the connecting member is movably arranged on the support frame, the support frame is disconnected from the nail gun after the connecting member is moved, and the connecting member is arranged to be returnable in position.

12. The nailing device according to claim 11, further comprising an elastic device which provides an elastic force, wherein the elastic force causes the connecting member to connect the support frame to the nail gun; and the elastic device is capable of making the connecting member return in position after the connecting member is moved.

13. The nailing device according to claim 12, wherein the connecting member is configured as a shifting lever, a connecting block, a knob or a cam, wherein the shifting lever is rotatably mounted on the support frame, the nail gun is provided with a plurality of first toothed grooves, and the plurality of first toothed grooves are arranged along a movement direction of the support frame; one end of the shifting lever is embedded into the first toothed groove to connect the support frame to the nail gun, and the other end of the shifting lever is arranged freely; the elastic device is a first elastic device disposed on the support frame, the first elastic device provides an elastic force, and the elastic force causes the shifting lever to have one end kept embedded into the first toothed groove; or at least one raised tooth is provided on the connecting block; the nail gun is provided with a plurality of second toothed grooves arranged along the movement direction of the support frame; the raised tooth is embedded into the second toothed groove to connect the support frame to the nail gun; the connecting block is movable perpendicular to a nail ejection direction; after the connecting block is moved, the raised tooth is withdrawn from the second toothed groove; the elastic device is a second elastic device which provides an elastic force, and the elastic force causes the connecting block to have the raised tooth kept embedded into the second toothed groove, and/or the knob is arranged on the support frame movably in a direction perpendicular to the nail ejection direction, and the knob is capable of abutting against the nail ejection portion; the knob abuts against the nail ejection portion to connect the support frame to the nail ejection portion; or the cam is rotatably mounted on the support frame, and the cam is capable of abutting against and releasing the abutment from the nail ejection portion during rotation; and the cam abuts against the nail ejection portion to connect the support frame to the nail ejection portion.

14. The nailing device according to claim 13, wherein the nail ejection portion comprises a nail ejection tube and a guide block, the guide block protruding from the nail ejection tube; and the first toothed grooves, the second toothed grooves or third toothed grooves are arranged on the guide block.

15. The nailing device according to claim 13, wherein the support frame is provided with a first shaft, and the shifting lever is rotatable about the first shaft; the support frame is provided with an accommodating hole and an opening, the opening is in communication with the accommodating hole, part of the nail ejection portion is inserted into the accommodating hole, and one end of the shifting lever is capable of passing through the opening and being embedded into the first toothed groove.

16. The nailing device according to claim 13, wherein the connecting block is provided with a pin, and the pin is movably arranged on the support frame; the second elastic device is a compression spring, which is sleeved on the pin, and has one end abutting against the support frame and the other end abutting against the connecting block; and when the pin moves, the connecting block is driven to move, and the compression spring is capable of making the pin and the connecting block return in position.

17. The nailing device according to claim 16, wherein in a movement direction of the raised tooth, a groove is provided on one side of the second toothed groove, and the raised tooth faces the groove after being withdrawn from the second toothed groove.

18. The nailing device according to claim 13, wherein the first elastic device is a torsion spring, and the second elastic device and a third elastic device are both cylindrical springs.

19. The nailing device according to claim 13, wherein the knob is a threaded fastener, which is in threaded fit with the support frame, and the threaded fastener passes through the support frame and abuts against the nail ejection portion.

* * * * *